United States Patent
Liu et al.

(10) Patent No.: US 11,309,722 B2
(45) Date of Patent: Apr. 19, 2022

(54) RECHARGEABLE BATTERY WITH USB CHARGING FUNCTION

(71) Applicants: Xiaoxiao Liu, Zhejiang (CN); Feng Wang, Zhejiang (CN)

(72) Inventors: Xiaoxiao Liu, Zhejiang (CN); Feng Wang, Zhejiang (CN)

( * ) Notice: Subject to any disclaimer, the term of this patent is extended or adjusted under 35 U.S.C. 154(b) by 0 days.

(21) Appl. No.: 17/023,378

(22) Filed: Sep. 17, 2020

(65) Prior Publication Data

US 2021/0408809 A1    Dec. 30, 2021

(30) Foreign Application Priority Data

Jun. 24, 2020   (CN) .......................... 202021210002.0

(51) Int. Cl.

| | |
|---|---|
| *H01M 10/46* | (2006.01) |
| *H02J 7/00* | (2006.01) |
| *H01M 50/213* | (2021.01) |
| *H01M 10/42* | (2006.01) |
| *H01M 10/48* | (2006.01) |

(52) U.S. Cl.
CPC ....... *H02J 7/0031* (2013.01); *H01M 10/4257* (2013.01); *H01M 10/46* (2013.01); *H01M 10/48* (2013.01); *H01M 50/213* (2021.01); *H02J 7/007* (2013.01)

(58) Field of Classification Search
CPC ........ H02J 7/0031; H02J 7/0042; H02J 7/007; H01M 10/46; H01M 10/48; H01M 10/4257

USPC ........ 320/107, 112, 114, 115, 132, 134, 136, 320/149
See application file for complete search history.

(56) References Cited

U.S. PATENT DOCUMENTS

| | | | | |
|---|---|---|---|---|
| 2016/0254574 | A1* | 9/2016 | Li | ...................... H02J 7/00309 320/107 |
| 2020/0343753 | A1* | 10/2020 | Gong | .................. H02J 7/00308 |

FOREIGN PATENT DOCUMENTS

CN          205004772 U      1/2016

OTHER PUBLICATIONS

CN 205004772 (Jan. 27, 16) (Year: 2016).*

* cited by examiner

*Primary Examiner* — Edward Tso (57) ABSTRACT

In the rechargeable battery with USB charging function, a cathode end of the battery body passes through the housing body and extends outside the housing body. One end of the circuit board is provided with an anode charging contact sheet, an anode discharging contact sheet and a ground contact sheet. Both the anode charging contact sheet and the anode discharging contact sheet are connected with an anode of the battery body. The anode charging contact sheet is connected with an anode pin of the male USB connector and the ground contact sheet is connected with a ground pin of the male USB connector when the male USB connector is inserted into a female USB connector; and the battery cover is provided with a conductive sheet which is electronically connected with the anode discharging contact sheet when the battery cover is connected with USB charging function.

9 Claims, 6 Drawing Sheets

RECHARGEABLE BATTERY WITH USB CHARGING FUNCTION

CROSS REFERENCE TO RELATED APPLICATIONS

This application claims priority to Chinese Patent Application No. 202021210002.0, filed on Jun. 24, 2020. The entirety of the above-mentioned patent application is hereby incorporated by reference herein and made a part of this specification.

TECHNICAL FIELD

This application relates to a technical field of a mobile power source, and in particular, to a rechargeable battery with USB charging function.

BACKGROUND

A rechargeable battery is a battery which is able to be recharged for limited times. It is classified into nickel-cadmium, nickel-metal hydrogen, lithium-ion, lead storage, iron lithium and so on. Generally, it is used with a charger and can be recharged for about 1000 times. Compared with a conventional zinc-manganese battery, the rechargeable battery has less waste of resources and less pollution, such that it is more environmentally friendly. The specification thereof is generally classified into AA size battery, AAA size battery, D size battery, etc. The rechargeable battery has advantages of economy, environmental protection and sufficient quantity of electricity, which is suitable for high-power electrical appliances used for a long time, such as walkman, remote control, electric toy, etc.

The Chinese application publication No. CN205004772U discloses a new type of battery charger, including a charging cradle, a cavity disposed at the charging cradle for accommodating a battery to be charged, a charge control circuit disposed in the charging cradle, and a plug connected with the charge control circuit for connecting with power supply. A plurality of battery accommodating slots are disposed in the cavity, and each battery accommodating slot can accommodate an AAA battery or an AA battery and is independently connected with the charge control circuit. In the battery charger, each battery accommodating slot is independently connected with the charge control circuit, so that individual batteries can be charged independently.

The above existing technical solution has the following drawback. Generally, the dedicated charging cradle of AA battery or AAA battery is required for the existing rechargeable battery to be recharged. Therefore, it is required to carry the charging cradle when carrying the rechargeable battery, which results in limited applicable scenarios, thereby reducing portability and applicability of the rechargeable battery.

BRIEF SUMMARY

In light of the problems present in the prior art, this application provides a rechargeable battery with USB charging function which does not need a dedicated charging cradle so as to improve the portability and applicability of the rechargeable battery.

A rechargeable battery with USB charging function includes a battery body and a housing body disposed outside the battery body. The rechargeable battery further includes a circuit board connected with the battery body, a male USB connector connected with the circuit board and a battery cover detachably connected with the male USB connector. A cathode end of the battery body passes through the housing body and extends outside the housing body. One end of the circuit board is provided with an anode charging contact sheet, an anode discharging contact sheet and a ground contact sheet. Both the anode charging contact sheet and the anode discharging contact sheet are connected with an anode of the battery body. The anode discharging contact sheet is located between the anode charging contact sheet and the ground contact sheet, and the anode charging contact sheet is connected with an anode pin of the male USB connector and the ground contact sheet is connected with a ground pin of the male USB connector when the male USB connector is inserted into a female USB connector.

The battery cover is provided with a conductive sheet which is electronically connected with the anode discharging contact sheet when the battery cover is connected with USB charging function.

By disposing the anode charging contact sheet, anode discharging contact sheet and ground contact sheet at one end of the circuit board, when the male USB connector is inserted into the female USB connector, the anode charging contact sheet and the ground contact sheet are respectively connected with the anode pin and the ground pin of the female USB connector, so as to achieve the charging of the battery body. When the rechargeable battery is supplying power to the electrical appliance such as the remote control, the battery cover is connected to the male USB connector, such that the appearance of the rechargeable battery is consistent with the appearance of AA size battery or AAA size battery. At this time, the conductive sheet is connected with the anode of the battery body by the anode discharging contact sheet, and the battery body discharges and supplies power to the electric appliance when the rechargeable battery is put inside the battery box of the electric appliance. The male USB connector has a wide applicable scenarios and strong compatibility, characteristics of recyclability, green environmental protection and long lifetime compared with the common dry battery, and there is no need to carry the dedicated charging cradle compared with the conventional rechargeable battery, thereby improving the portability and applicability of the rechargeable battery.

Preferably, the circuit board is provided with an over-charge protection circuit including a microcontroller unit (MCU) and a first switch member connected with the MCU, the MCU is connected with the anode of the battery body for receiving a voltage signal of the anode of the battery body and outputs a control signal when the voltage signal of the anode of the battery body is greater than a set over-charge value, and the first switch member disconnects connection between the anode of the battery body and the anode charging contact sheet when receiving the voltage signal.

An ideal fully-charged voltage of the lithium battery is 4.2v and the rechargeable battery may be damaged if the voltage exceeds 4.2v. The control signal is output when the voltage signal of the anode of the battery body is greater than the set over-charge value which is lower than 4.2V. At this time, the first switch member disconnects the connection between the anode of the battery body and the anode charging contact sheet when receiving the control signal, so as to avoid damage to the rechargeable battery due to over-charge, thereby protecting the rechargeable battery.

Preferably, the circuit board is provided with an over-discharge protection circuit including a second switch member connected with the MCU which outputs a protection signal when the voltage signal of the anode of the battery body is lower than a set over-discharge value, and the second switch member disconnects connection between the anode of the battery body and the anode discharging contact sheet when receiving the protection signal.

When the lithium battery is discharging, if the voltage is lower than the set over-discharge value which is above 2.2V, the lithium battery may be damaged. Therefore, the MCU outputs the protection signal when the voltage signal of the anode of the battery body is lower than the set over-discharge value, and the second switch member disconnects the connection between the anode of the battery body and the anode discharging contact sheet when receiving the protection signal, so as to disconnect the discharging loop of the battery body and prolongs the lifetime thereof, thereby protecting the rechargeable battery.

Preferably, the circuit board is provided with an indication assembly including a charging indication light electrically connected with the anode charging contact sheet and the MCU, and the charging indication light lights up when receiving the voltage signal of the anode charging contact sheet and is turned off when receiving the control signal.

The charging indication light can indicate a current charging state of the rechargeable battery. If the charging indication light does not light up during charging, it indicates that there may be a poor contact or the female USB connector is out of power, so as to facilitate a user to find and troubleshoot the problem in time, thereby avoiding a situation that the rechargeable battery cannot be charged.

Preferably, the indication assembly further includes a charging completion indication light which is electrically connected with the MCU and lights up when receiving the control signal.

The charging completion indication light can indicate a current fully-charged state of the rechargeable battery, so as to indicate the user to take out the rechargeable battery in time thereby avoiding over-charge and prolonging the lifetime of the rechargeable battery. If the charging completion indication light does not light up when the rechargeable battery is charged for a long time, it indicates that there may be a failure on the charging completion indication light or a line failure, or a supply voltage across the USB connector is insufficient, so as to facilitate the user to find and troubleshoot the problem in time, thereby avoiding the situation that the rechargeable battery cannot be charged.

Preferably, a light-transmitting layer is disposed at the housing body on one side opposite to the indication assembly.

By disposing the light-transmitting layer, the light emitted by the charging indication light or the charging completion indication light passes through the housing body, which indicates the current state of the rechargeable battery for the user, so as to facilitate the user to take measures to solve possible problems. If the charging indication light does not light up during charging, it indicates that there may be the poor contact or the female USB connector is out of power, so as to facilitate the user to find and troubleshoot the problem in time, thereby avoiding the situation that the rechargeable battery cannot be charged. If the charging completion indication light does not light up when the rechargeable battery is charged for a long time, it indicates that there may be the failure on the charging completion indication light or the line failure, or the supply voltage across the USB connector is insufficient, so as to facilitate the user to find and troubleshoot the problem in time, thereby avoiding the situation that the rechargeable battery cannot be charged.

Preferably, the circuit board engages with the male USB connector by inserting the circuit board into the male USB connector, and one side of the circuit board abuts against an inner wall of the male USB connector at one side, and an insertion slot is formed between the other side of the circuit board and an inner wall of the male USB connector on the other side for an insulation sheet in the male USB connector to be inserted.

Due to the engagement of the circuit board with the male USB connector, the shape and size of an interior of the male USB connector are consistent with those of a conventional male USB connector, so that an insertion slot is formed between the other side of the circuit board and an inner wall of the male USB connector on the other side for an insulation sheet in the male USB connector to be inserted, which improves the compatibility of the rechargeable battery as well as the stability of the connection between the male USB connector and the female USB connector.

Preferably, the battery cover has a mounting slot for the male USB connector to be inserted, a support plate is disposed in the mounting slot, the battery cover has a through hole communicating with the mounting slot, the conductive sheet includes an arc-shaped anode sheet and a connection contact sheet connected with the anode sheet, the connection contact sheet is inserted to contact the support plate when the connection contact sheet is inserted into the through hole, and the anode discharging contact sheet abuts against the connection contact sheet at a convex arc side when the male USB connector is inserted into the battery cover.

When the connection contact sheet is inserted into the battery cover, the connection contact sheet is inserted to contact the support plate, so as to fix the connection contact sheet. When the male USB connector is inserted into the mounting slot of the battery cover, the anode discharging contact sheet abuts against the connection contact sheet at the convex arc side, so as to press the connection contact piece, such that the anode discharging contact sheet is electrically connected with the connection contact sheet, and the anode sheet and the cathode of the battery body cooperate with each other to supply power to the electrical appliance such as the remote control.

Preferably, the anode sheet that is circular is provided with fastening sheets which are symmetrically disposed along a circumference of the anode sheet, the fastening sheets pass through the battery cover and extend into the mounting slot, and an angle is formed between a portion of the fastening sheet passing through the battery cover and a portion of the fastening sheet extending into the mounting slot.

The anode sheet is used to connect the anode of the electrical appliance such as the remote control. When the anode sheet is connected with the battery cover, fastening sheets are inserted into the battery cover and extend into the mounting slot. At this time the angle is formed between the portion of the fastening sheet passing through the battery cover and the portion of the fastening sheet extending into the mounting slot by bending the fastening sheet, so as to prevent the fastening sheet from separating from the battery cover, thereby improving the firmness of the anode sheet and preventing the anode sheet from being loosened which affects the normal power supply of the electrical appliance by the rechargeable battery.

Preferably, a magnetic block is disposed on the battery cover on one side connected with the male USB connector, the magnetic block and the male USB connector are attracted with each other when the male USB connector is inserted into the battery cover, and the battery cover and a cathode of the battery body are attracted with each other when the battery cover abuts against the cathode of the battery body.

When the male USB connector is inserted into the battery cover, the magnetic block increases the strength of the connection between the battery cover and the male USB connector by a magnetic field, so as to prevent the battery cover from losing caused by falling. When the male USB connector is inserted into the female USB connector of a computer or other device for charging, the battery cover can be attracted to the cathode end of the battery body made of metal via the magnetic block, so as to prevent the battery cover from losing caused by falling.

This application has at least one of the following beneficial technical effects.

When the male USB connector is inserted into the female USB connector, the anode charging contact sheet and the ground contact sheet are respectively connected with the anode pin and the ground pin of the female USB connector, so as to achieve the charging of the battery body. When the rechargeable battery is supplying power to the electrical appliance such as the remote control, the battery cover covers the male USB connector, such that the appearance of the rechargeable battery is consistent with the appearance of AA size battery or AAA size battery. At this time, the conductive sheet is connected with the anode of the battery body by the anode discharging contact sheet, and the battery body discharges and supplies power to the electric appliance when the rechargeable battery is put inside the battery box of the electric appliance. The rechargeable battery with the male USB connector has characteristics of recyclability, green environmental protection and long lifetime, and there is no need to carry the dedicated charging cradle, thereby improving the portability and applicability of the rechargeable battery.

The connection contact sheet is inserted into the battery cover to contact the support plate, so as to fix the connection contact sheet. When the male USB connector is inserted into the mounting slot, the anode discharging contact sheet abuts against the connection contact sheet at the convex arc side, so as to press the connection contact piece, such that the anode discharging contact sheet is electrically connected with the connection contact sheet, and the anode sheet and the cathode of the battery body cooperate with each other to supply power to the electrical appliance such as the remote control.

DETAILED DESCRIPTION

This application is described in detail below in combination with the drawings.

Figure 1:
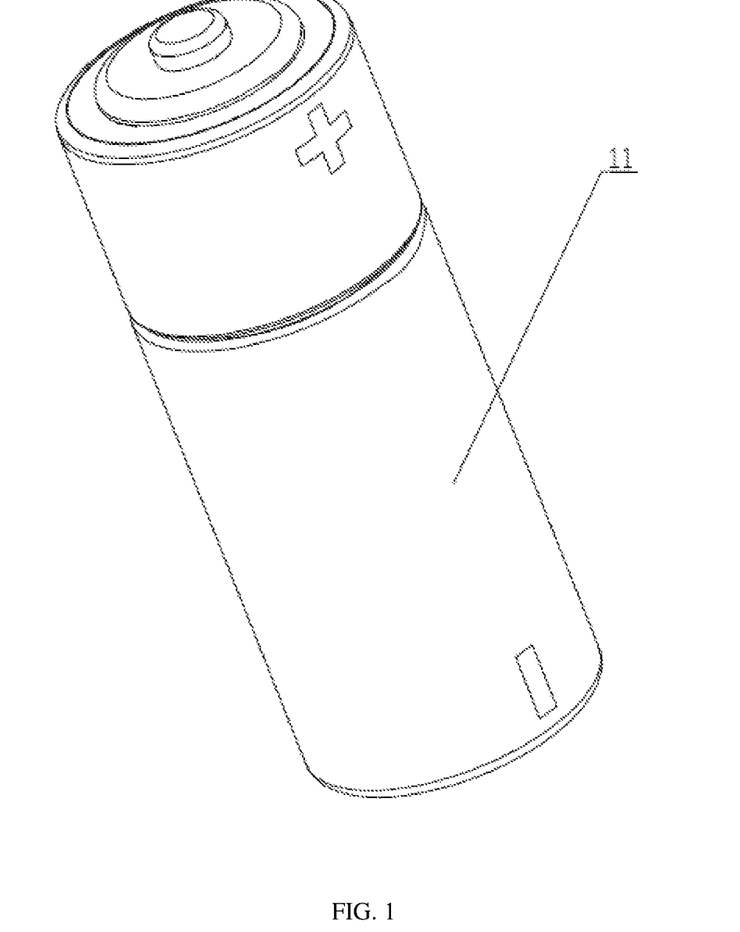
FIG. 1 is a schematic diagram of an overall structure of this embodiment.
Figure 2:
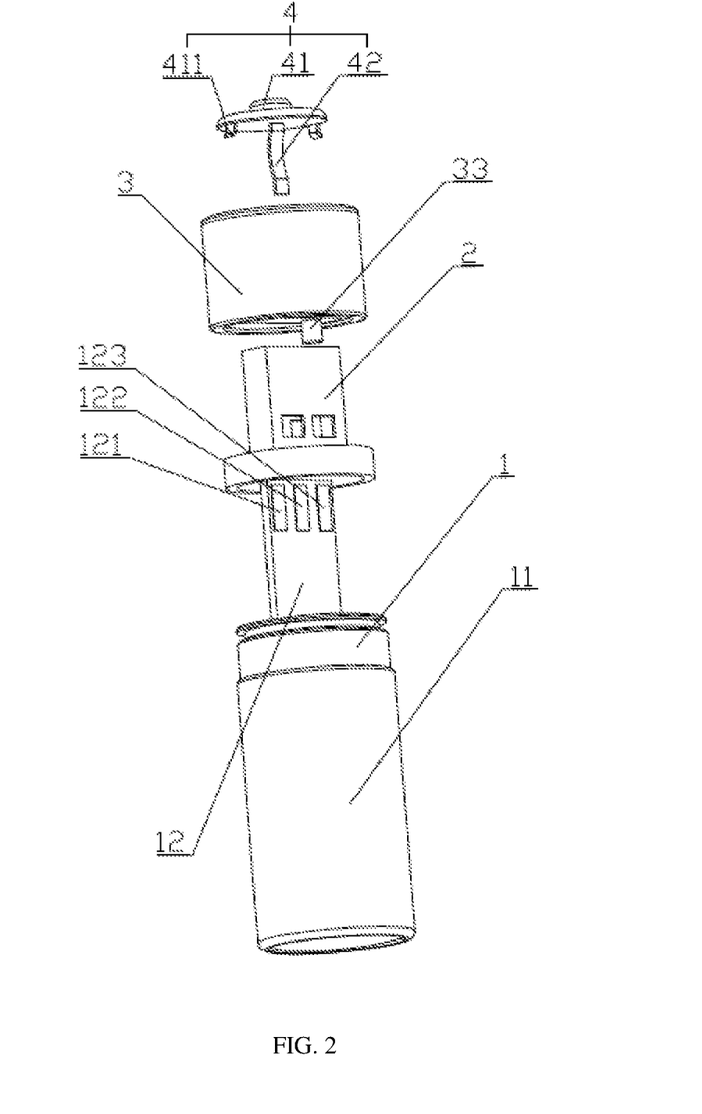
FIG. 2 is a schematic diagram of an exploded structure of this embodiment.

Referring to FIG. 1 and FIG. 2, this application provides a rechargeable battery with USB charging function which is charged via the male USB connector instead of a dedicated charging cradle, thereby improving applicability. It includes a battery body 1, a housing body 11 disposed outside the battery body 1 and a circuit board 12 connected with the battery body 1. The battery body 1 may be a lithium battery which has advantages of high stored energy density, long lifetime, no memory effect, and green environmental protection and can be recycled for thousands of times compared with a conventional zinc-manganese dry battery, thereby reducing waste of resources and improving environmental protection.

Both the battery body 1 and the housing body 11 are cylindrical and fixed to each other by an adhesive. The housing body 11 is made of an insulating material, so as to reduce a leakage for the battery body 1 thereby prolonging the lifetime. A cathode end of the battery body 1 passes through the housing body 11 and extends outside the housing body 11, and an anode end thereof is connected with the circuit board 12 by a conductive wire. The circuit board 12 is square, which is located at the side of the anode of the battery body 1 and fixed to the housing body 11 by the adhesive. One end of the circuit board 12 is provided with an anode charging contact sheet 121, an anode discharging contact sheet 122 and a ground contact sheet 123 which are all made of copper. The anode charging contact sheet 121, anode discharging contact sheet 122 and ground contact sheet 123 are all disposed at one side of the circuit board 12, spaced apart from and parallel with each other with the anode discharging contact sheet 122 being disposed between the anode charging contact sheet 121 and the ground contact sheet 123. Both the anode charging contact sheet 121 and the anode discharging contact sheet 122 are connected with the anode of the battery body 1.

Figure 3:
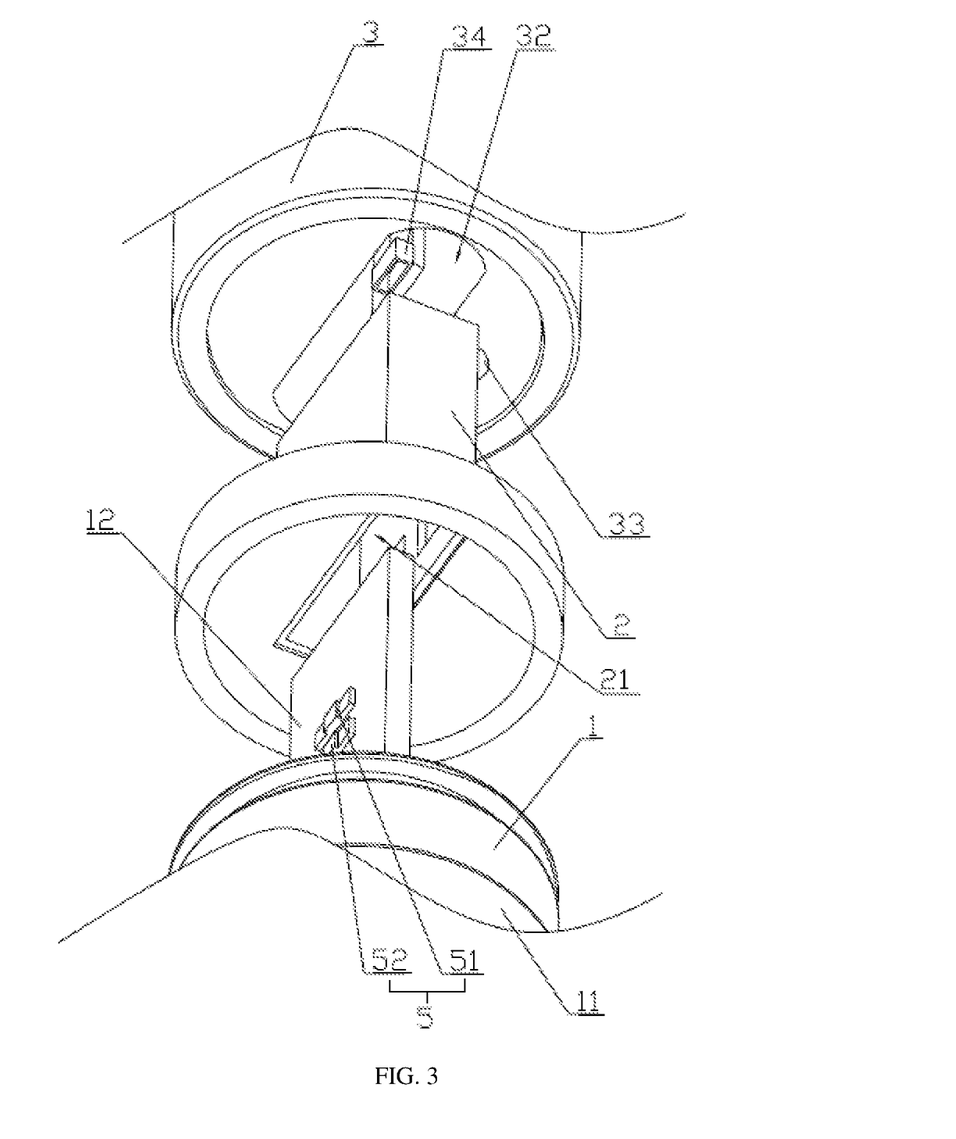
FIG. 3 is a schematic diagram of part of the exploded structure of this embodiment, mainly showing a support plate.

Referring to FIG. 2 and FIG. 3, the male USB connector 2 connected to the circuit board 12 is mounted at the housing body 11, which is a cuboid with openings on both sides and is hollow inside. The male USB connector 2 is fixed to the housing body 11 by inserting the male USB connector 2 into the housing body 11 and the circuit board 12 is inserted into the male USB connector 2. One side of the circuit board 12 away from the ground contact sheet 123 abuts against an inner wall of the male USB connector at one side, and a square insertion slot 21 is formed between the other side of the circuit board 12 and an inner wall of the male USB connector on the other side for an insulation sheet of the male USB connector 2 to be inserted. At this time, the shape and size of an interior of the male USB connector 2 are consistent with those of a conventional male USB connector, so as to achieve that the male USB connector 2 is inserted into a conventional female USB connector, which improves the compatibility of the rechargeable battery as well as the stability of the connection between the male USB connector 2 and the female USB connector. When the male USB connector 2 is inserted into the female USB connector, the anode charging contact sheet 121 is connected with an anode pin on an insulation sheet of the female USB connector, the ground contact sheet 123 is connected with a ground pin on the insulation sheet of the female USB connector, and the anode discharging contact sheet 122 is not connected with the anode pin or the ground pin of the female USB connector, such that a charging loop of the battery body 1 is formed, and 5V voltage signal of the female USB connector charges the battery body 1.

Figure 4:
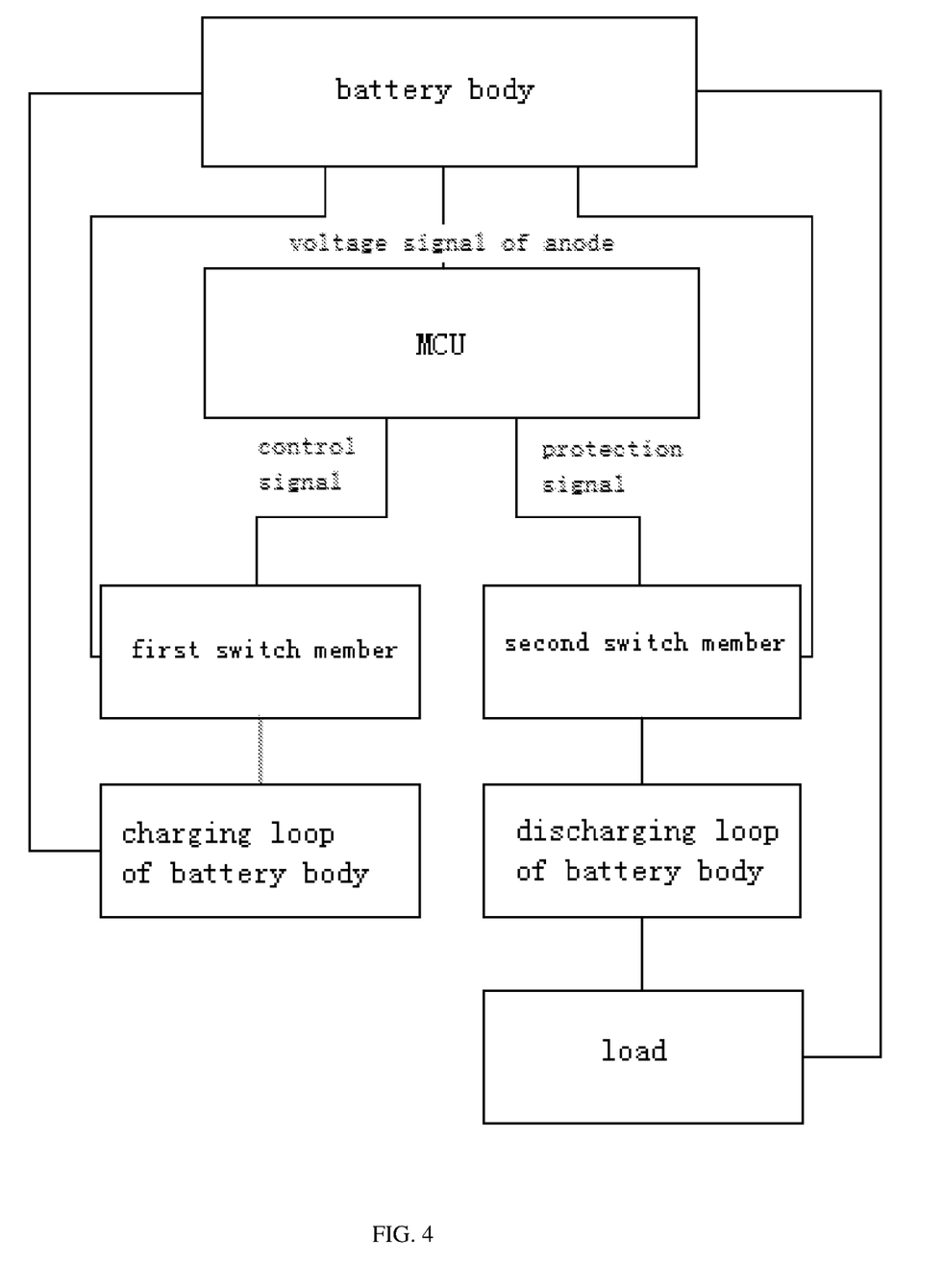
FIG. 4 is a functional block diagram of this embodiment.

Referring to FIG. 2 and FIG. 4, an ideal fully-charged voltage of the lithium battery is 4.2v and the rechargeable battery may be damaged if the voltage exceeds 4.2v. Therefore the circuit board 12 is provided with an over-charge protection circuit. The over-charge protection circuit includes a microcontroller unit (MCU) and a first switch member connected with the MCU, and a control terminal of the first switch member is connected with an output pin of the MCU. The MCU may be an SL3052 chip, and the first switch member may be a triode or an MOS transistor, etc. The MCU is connected with the anode of the battery body 1 for receiving a voltage signal of the anode of the battery body 1. A voltage across the anode of the battery body 1 will increase during charging, and based on this, the MCU will output a control signal when the voltage signal of the anode of the battery body 1 is greater than a set over-charge value. The set over-charge value may be 4.2V. The first switch member disconnects the connection between the anode of the battery body 1 and the anode charging contact sheet 121 when receiving the control signal from the MCU, so as to disconnect the charging loop of the battery body 1 and avoid damage to the rechargeable battery due to over-charge, thereby protecting the rechargeable battery.

Referring to FIG. 2 and FIG. 3, the circuit board 12 is provided with an indication assembly 5 which includes a charging indication light 51 and a charging completion indication light 52. Both the charging indication light 51 and the charging completion indication light 52 are LED lights, and the two emit light with different colors for differentiation. The charging indication light 51 is electrically connected with the anode charging contact sheet 121 and the MCU. The charging indication light 51 lights up when receiving the voltage signal of the anode charging contact sheet 121 and is turned off when receiving the control signal from the MCU, that is, it lights up when the male USB connector 2 is inserted into the female USB connector and is turned off when the battery body 1 is fully charged, so as to indicate a charging state and a fully-charged state. In addition, if the charging indication light 51 does not light up during charging, it indicates that there may be a poor contact or the female USB connector is out of power, so as to facilitate a user to find and troubleshoot the problem in time, thereby avoiding a situation that the rechargeable battery cannot be charged.

The charging completion indication light 52 is electrically connected with the MCU. The charging completion indication light 52 lights up when receiving the control signal, so as to indicate the current fully-charged state of the rechargeable battery and indicate the user to take out the rechargeable battery in time thereby avoiding over-charge and prolonging the lifetime of the rechargeable battery. If the charging completion indication light 52 does not light up when the rechargeable battery is charged for a long time, it indicates that there may be a failure on the charging completion indication light 52 or a line failure, or a supply voltage across the USB connector is insufficient, so as to facilitate the user to find and troubleshoot the problem in time, thereby avoiding the situation that the rechargeable battery cannot be charged. A light-transmitting layer is disposed at the housing body 11 at the side opposite to the indication assembly 5 and is made of a transparent acrylic material, such that the light emitted by the charging indication light 51 or the charging completion indication light 52 passes through the housing body 11, which indicates the current state of the rechargeable battery for the user, so as to facilitate the user to take measures to solve possible problems.

Figure 5:
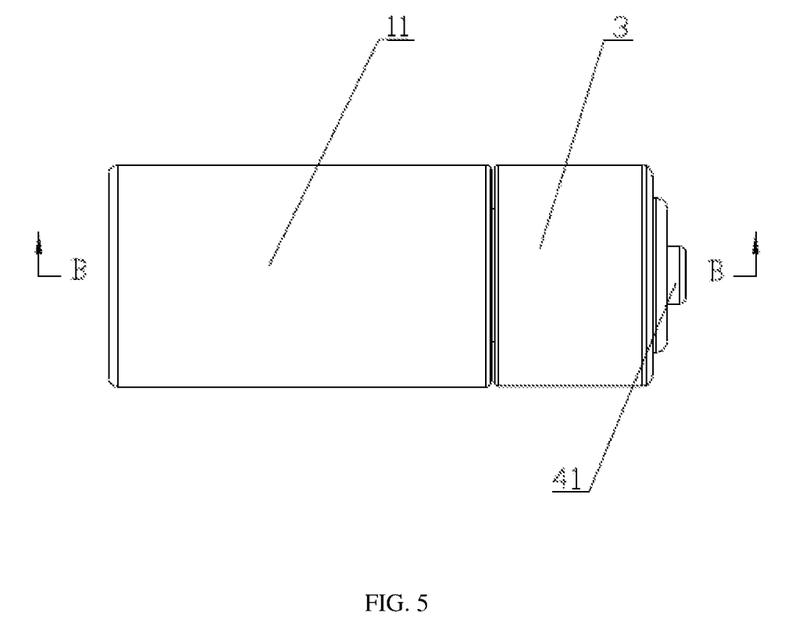
FIG. 5 is a schematic diagram of a side view of this embodiment.
Figure 6:
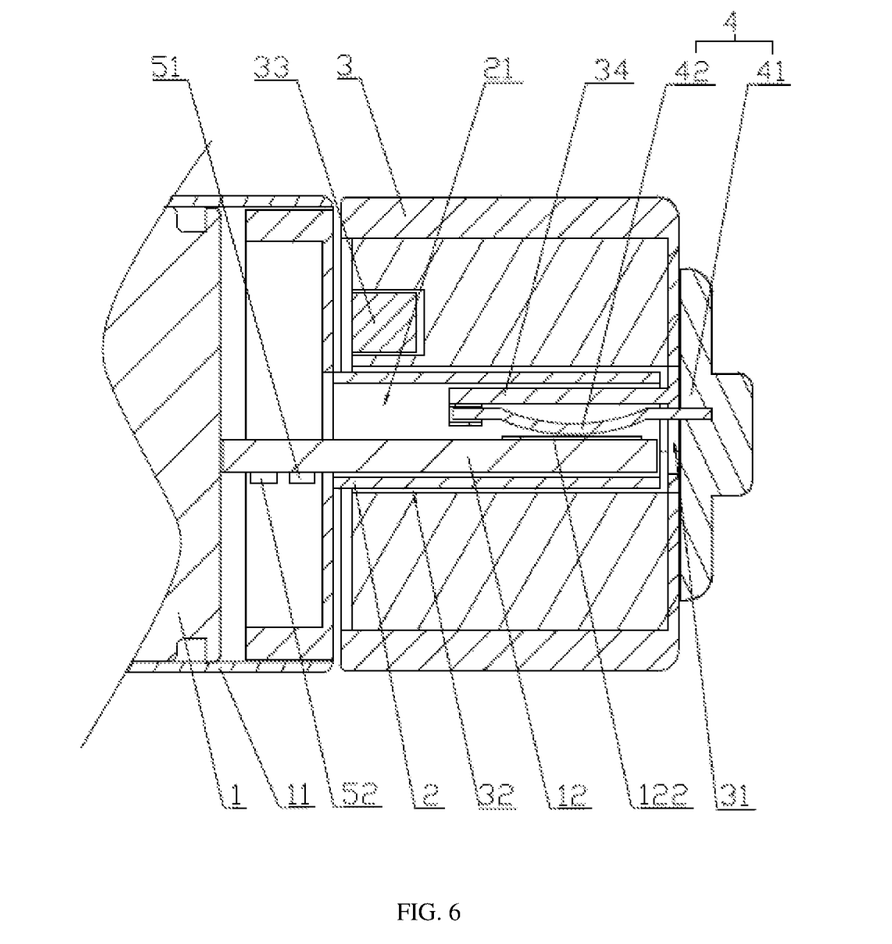
FIG. 6 is a schematic diagram of a cross-sectional structure along line B-B in FIG. 5, mainly showing a through hole.

Referring to FIG. 5 and FIG. 6, the housing body 11 is detachably connected with a battery cover 3 which is cylindrical. One end of the battery cover 3 has a mounting slot 32 which is a cuboid for the male USB connector 2 to be inserted. A support plate 34 integrally formed with the battery cover 3 is provided in the mounting slot 32, and an aperture is formed between the support plate 34 and an inner wall of the mounting slot 32 for a side wall of the male USB connector 2 to be inserted, thereby enhancing the strength of the connection between the male USB connector 2 and the battery cover 3. A magnetic block 33 located near the edge of the opening of the mounting slot 32 is fixed to the battery cover 3 by insertion, and the magnetic block 33 is fixed to the battery cover 3 by the adhesive. As the male USB connector 2 is made of a magnetically conductive metal material, the magnetic block 33 and the male USB connector 2 are attracted to each other when the male USB connector 2 is inserted into the battery cover 3, thereby enhancing the strength of the connection between the battery cover 3 and the male USB connector 2, which prevents the battery cover 3 from losing caused by falling. When the male USB connector 2 is inserted into the female USB connector of a computer or other device for charging, the battery cover 3 can be attracted to the cathode end of the battery body 1 made of metal via the magnetic block 33, so as to prevent the battery cover 3 from losing caused by falling.

Referring to FIG. 2 and FIG. 5, the battery cover 3 is provided with a conductive sheet 4 including an arc-shaped anode sheet 41 and a connection contact sheet 42 connected to the anode sheet 41 which are all made of conductive metal. The anode sheet 41 is circular with a protrusion in the center, which has a shape consistent with an anode end of a common dry battery. It is used to connect with an anode of an electrical appliance such as a remote control. The anode sheet 41 is integrally provided with two fastening sheets 411 which are symmetrically disposed along a circumference of the anode sheet 41, and the fastening sheets 411 pass through the battery cover 3 and extend into the mounting slot 32. An angle is formed between a portion of the fastening sheet 411 passing through the battery cover 3 and a portion of the fastening sheet 411 extending into the mounting slot 32 by bending the fastening sheet 411, so as to prevent the fastening sheet 411 from separating from the battery cover 3, thereby improving the firmness of the anode sheet 41 and preventing the anode sheet 41 from being loosened which affects the normal power supply of the electrical appliance by the rechargeable battery.

The battery cover 3 has a through hole 31 communicating with the mounting slot 32 at a center of one side wall, and the connection contact sheet 42 contacts with the support plate 34 when the connection contact sheet 42 is inserted into the through hole 31 so as to fix the connection contact sheet 42. When the male USB connector 2 is inserted into the mounting slot 32 of the battery cover 3, the anode discharging contact sheet 122 abuts against the connection contact sheet 42 at a convex arc side, so as to press the connection contact sheet 42 such that the anode discharging contact sheet 122 is electrically connected with the connection contact sheet 42, and the anode sheet 41 is connected with the anode of the battery body 1. The anode sheet 41 and the cathode of the battery body 1 cooperate with each other which respectively correspond to an anode and a cathode of a battery box of the electrical appliance such as the remote control for power supply to the electrical appliance. The circuit board 12 is provided with a voltage regulation chip which may adopt an LM2596 series for reducing the voltage output from the battery body 1 to 1.5V which is a standard voltage of the dry battery, thereby improving the compatibility and applicability of the rechargeable battery.

Referring to FIG. 4 and FIG. 6, when the lithium battery is discharging, if the voltage is lower than a set over-discharge value which may be in a range of 2.2V-2.75V, the lithium battery may be damaged. Therefore, the circuit board 12 is provided with an over-discharge protection circuit including a second switch member connected with the MCU, and a control terminal of the second switch member is connected with the output pin of the MCU. The second switch member may be a switch element such as a triode, an MOS transistor, etc. An input pin of the MCU receives the voltage signal of the anode of the battery body 1, and the MCU outputs a protection signal when the voltage signal of the anode of the battery body 1 is lower than the set over-discharge value. The second switch member disconnects the connection between the anode of the battery body 1 and the anode discharging contact sheet 122 when receiving the protection signal from the MCU, so as to disconnect a discharging loop of the battery body 1 and prolongs the lifetime thereof, thereby protecting the rechargeable battery.

An implementation principle of this embodiment is: when the rechargable battery is charged, the user only needs to remove the battery cover 3 and insert the male USB connector 2 into the female USB connector of the computer or other equipment, such that the anode charging contact sheet 121 and the ground contact sheet 123 are respectively connected with the anode pin and the ground pin of the female USB connector, so as to achieve the charge of the battery body 1. At this time, the charging indication light 51 lights up which indicates that the rechargeable battery is in the charging state, and then the battery cover 3 is attracted to the cathode of the battery body 1 through the magnetic block 33 so as to avoid loss.

When the rechargeable battery is supplying power to the electrical appliance such as the remote control, the battery cover 3 covers the male USB connector 2, such that the appearance of the rechargeable battery is consistent with the appearance of AA battery or AAA battery, and then the rechargeable battery is put inside the battery box of the electrical appliance such as the remote control. At this time, the conductive sheet 4 is connected with the anode of the battery body 1 through the anode discharging contact sheet 122, and the battery body 1 discharges and supplies power to the electric appliance when the rechargeable battery is put inside the battery box of the electric appliance.

By adopting the male USB connector 2 for charging, the rechargeable battery has a wide applicable scenarios and strong compatibility. It has characteristics of recyclability, green environmental protection and long lifetime compared with the common dry battery, and there is no need to carry the dedicated charging cradle compared with the conventional rechargeable battery, thereby improving the portability and applicability of the rechargeable battery.

What is provided above is merely some preferred embodiments of this application. The scope of this application is not limited by the above embodiments. Therefore, some improvements and modifications can be made by those skilled in the art without departing from the principle of this application, and should be considered to fall within the scope of this application.

What is claimed is:

1. A rechargeable battery with USB charging function comprising a battery body and a housing body disposed outside the battery body, wherein the rechargeable battery further comprises a circuit board connected with the battery body, a male USB connector connected with the circuit board and a battery cover detachably connected with the male USB connector, a cathode end of the battery body passes through the housing body and extends outside the housing body, one end of the circuit board is provided with an anode charging contact sheet, an anode discharging contact sheet and a ground contact sheet, both the anode charging contact sheet and the anode discharging contact sheet are connected with an anode of the battery body, the anode discharging contact sheet is located between the anode charging contact sheet and the ground contact sheet, and when the male USB connector is inserted into a female USB connector the anode charging contact sheet is connected with an anode pin of the male USB connector and the ground contact sheet is connected with a ground pin of the male USB connector; and the battery cover is provided with a conductive sheet which is electronically connected with the anode discharging contact sheet when the battery cover is connected with USB charging function, wherein the circuit board is provided with an over-charge protection circuit comprising a microcontroller unit and a first switch member connected with the microcontroller unit, the microcontroller unit is connected with the anode of the battery body for receiving a voltage signal of the anode of the battery body and outputs a control signal when the voltage signal of the anode of the battery body is greater than a set over-charge value, and the first switch member disconnects connection between the anode of the battery body and the anode charging contact sheet when receiving the voltage signal.

2. The rechargeable battery with USB charging function according to claim 1, wherein the circuit board is provided with an over-discharge protection circuit comprising a second switch member connected with the microcontroller unit which outputs a protection signal when the voltage signal of the anode of the battery body is lower than a set over-discharge value, and the second switch member disconnects connection between the anode of the battery body and the anode discharging contact sheet when receiving the protection signal.

3. The rechargeable battery with USB charging function according to claim 1, wherein the circuit board is provided with an indication assembly comprising a charging indication light electrically connected with the anode charging contact sheet and the microcontroller unit, and the charging indication light lights up when receiving the voltage signal of the anode charging contact sheet and is turned off when receiving the control signal.

4. The rechargeable battery with USB charging function according to claim 3, wherein the indication assembly further comprises a charging completion indication light which is electrically connected with the microcontroller unit and lights up when receiving the control signal.

5. The rechargeable battery with USB charging function according to claim 3, wherein a light-transmitting layer is disposed at the housing body on one side opposite to the indication assembly.

6. The rechargeable battery with USB charging function according to claim 1, wherein the circuit board engages with the male USB connector by inserting the circuit board into the male USB connector, and one side of the circuit board abuts against an inner wall of the male USB connector at one side, and an insertion slot is formed between the other side of the circuit board and an inner wall of the male USB connector on the other side for an insulation sheet in the male USB connector to be inserted.

7. The rechargeable battery with USB charging function according to claim 1, wherein the battery cover has a mounting slot for the male USB connector to be inserted, a support plate is disposed in the mounting slot, the battery cover has a through hole communicating with the mounting slot, the conductive sheet comprises an arc-shaped anode sheet and a connection contact sheet connected with the anode sheet, the connection contact sheet is inserted to contact the support plate when the connection contact sheet is inserted into the through hole, and the anode discharging contact sheet abuts against the connection contact sheet at a convex arc side when the male USB connector is inserted into the battery cover.

8. The rechargeable battery with USB charging function according to claim 7, wherein the anode sheet that is circular is provided with fastening sheets which are symmetrically disposed along a circumference of the anode sheet, the fastening sheets pass through the battery cover and extend into the mounting slot, and an angle is formed between a portion of the fastening sheet passing through the battery cover and a portion of the fastening sheet extending into the mounting slot.

9. The rechargeable battery with USB charging function according to claim 1, a magnetic block is disposed on the battery cover on one side connected with the male USB connector, the magnetic block and the male USB connector are attracted with each other when the male USB connector is inserted into the battery cover, and the battery cover and a cathode of the battery body are attracted with each other when the battery cover abuts against the cathode of the battery body.

\* \* \* \* \*